US005089166A

United States Patent [19]

Clements

[11] Patent Number: 5,089,166

[45] Date of Patent: Feb. 18, 1992

[54] BLEACHING AND DETERGENT COMPOSITIONS

[75] Inventor: Anthony H. Clements, Cefyn y Bedd, near Wrexham, Great Britain

[73] Assignee: Lever Brothers Company, Division of Conopco, Inc., New York, N.Y.

[21] Appl. No.: 420,208

[22] Filed: Oct. 12, 1989

[30] Foreign Application Priority Data

Oct. 14, 1988 [GB] United Kingdom ................. 8824108

[51] Int. Cl.[5] ...................... C01B 15/055; C09K 11/06

[52] U.S. Cl. ............................ 252/186.1; 252/186.21; 252/186.42; 252/186.43; 252/301.21; 252/301.32; 252/95

[58] Field of Search ........... 252/186.1, 186.21, 186.42, 252/186.43, 301.21, 301.32, 558

[56] References Cited

U.S. PATENT DOCUMENTS

| | | | |
|---|---|---|---|
| B 440,858 | 2/1976 | Hartmann et al. | 252/301.32 |
| 2,852,503 | 9/1958 | Long et al. | 252/301.32 |
| 3,859,350 | 1/1975 | Sahm et al. | 252/301.32 |
| 3,994,879 | 11/1976 | Sahm | 260/240 |
| 4,002,423 | 1/1977 | Sahm et al. | 8/137 |
| 4,222,739 | 9/1980 | Kägi et al. | 252/301.32 |
| 4,407,743 | 10/1983 | Tseng | 252/186.43 |
| 4,670,882 | 6/1987 | Telle et al. | 372/53 |

FOREIGN PATENT DOCUMENTS

| | | |
|---|---|---|
| 2593388 | 1/1989 | Australia . |
| 57-002399 | 1/1982 | Japan . |
| 1414670 | 8/1972 | United Kingdom . |

*Primary Examiner*—Richard D. Lovering
*Assistant Examiner*—Joseph D. Anthony
*Attorney, Agent, or Firm*—Milton L. Honig

[57] ABSTRACT

Storage-stable washing and/or bleaching compositions containing a peroxyacid and/or a peroxyacid-yielding compound as bleaching agent are disclosed which contain as optical brightener a benzofuranyl biphenyl compound of the formula:

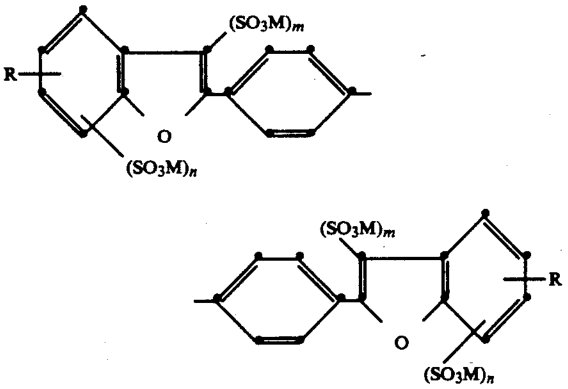

wherein R is hydrogen, $C_1$–$C_4$ alkyl, $C_1$–$C_4$ alkoxy, halogen, phenoxy or benzyloxy as mono or multiple substituent; M is hydrogen and/or an equivalent of a non-chromophoric cation; n is an integer from 0–2, and m is 0 or 1, with the proviso that n and m are not both zero.

3 Claims, No Drawings

BLEACHING AND DETERGENT COMPOSITIONS

The present invention relates to bleaching and detergent compositions, and particularly to the use of sulphonated benzofuranyl biphenyl compounds as optical brighteners in bleaching compositions. These bleaching compositions are particularly, but not exclusively, suited to the bleaching of fabrics, and for this purpose they may also contain detergent-active compounds.

Mixtures of sulphonated benzofuranyl biphenyl compounds having an undefined composition and structure as well as their use as optical brighteners have been known for a long time (DE-A-22 38 734, DE-A-22 38 628, DE-A-23 61 338 and DE-A-28 43 850). The effectiveness of such mixtures for brightening cotton was, however, low. Also there has long existed a problem in the formulation of peroxyacid bleaching compositions including an optical brigthener in that the majority of optical brighteners of the art are not sufficiently stable in a peroxyacid environment. The use of peroxyacids in bleaching and detergent formulations enables washing at lower temperatures, e.g. from 20° C. to 40° C., but at the same time presents a particularly hostile environment for optical brighteners. Only a very few specific optical brightener compounds are known to sufficiently stand up against the action of strong oxidizing bleaches.

There is thus a continuous need to search for better and more stable optical brighteners which are suitable for use in bleaching and/or detergent compositions containing a peroxyacid or a peroxyacid-yielding compound as the bleach system.

It has now surprisingly been found that specific sulphonated benzofuranyl biphenyl compounds of a structure as hereinafter defined are optical brightening agents having a very good stability with respect to oxidizing and bleaching agents based on inorganic and/or organic peroxyacids and as such can be used in bleaching and/or detergent compositions containing a peroxyacid or a peroxyacid-yielding compound as the bleach system.

The invention therefore provides storage-stable washing and/or bleaching compositions containing a peroxyacid and/or a peroxyacid-yielding compound as bleaching agent and a benzofuranyl biphenyl compound as optical brightener according to formula (I)

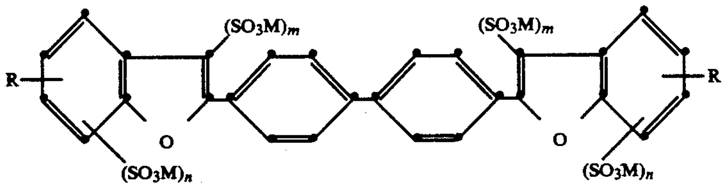
(I)

which has optionally been substituted several times with radicals R=hydrogen, $C_1$–$C_4$ alkyl, $C_1$–$C_4$ alkoxy, halogen, phenoxy and benzyloxy, and in which M=hydrogen and/or an equivalent of a non-chromophoric cation, n is 0, 1 or 2, and m is 0 or 1, with the proviso that n and m are not both 0.

The benzofuranyl biphenyl compounds as herein defined are furthermore characterized by their excellent light-stability.

Where M is a non-chromophoric cation, it may be e.g. an alkaline earth metal such as magnesium and calcium, but is preferably an alkali metal such as lithium, sodium, potassium, as well as substituted or unsubstituted ammonium such as ammonium, monoethanol ammonium, diethanol ammonium or triethanol ammonium, monopropanol ammonium, dipropanol ammonium or tripropanol ammonium or trimethylammonium or tetramethyl ammonium.

Compounds having the formulae (II) and (V) are preferred.

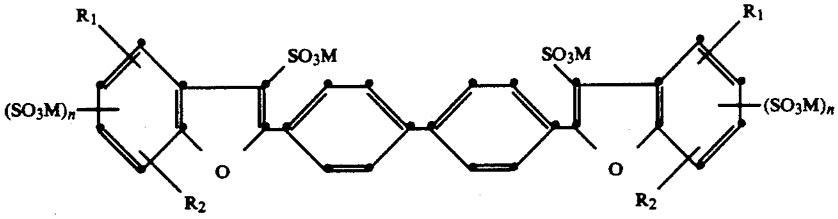
(II)

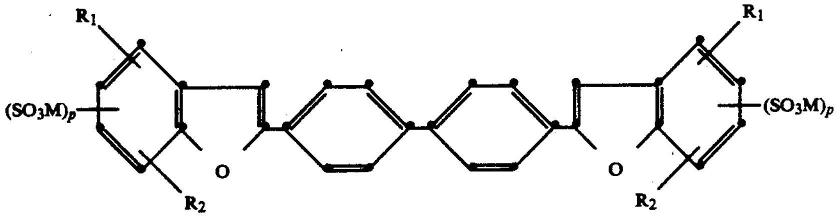
(V)

in which $R_1$=hydrogen, $C_1$–$C_4$ alkyl, chlorine, $C_1$–$C_4$ alkoxy, phenoxy or benzyloxy, $R_2$=hydrogen, $C_1$–$C_4$ alkyl, chlorine or $C_1$–$C_4$ alkoxy, M=hydrogen and/or an equivalent of a non-chromophoric cation and n is 0 or 1 and p is 1 or 2, and particularly compounds having the formulae (III), (VI) and (VIII).

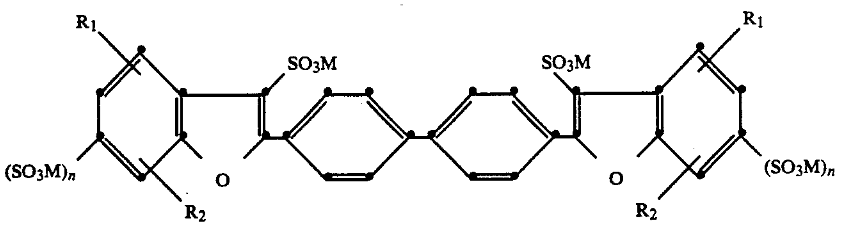
(III)

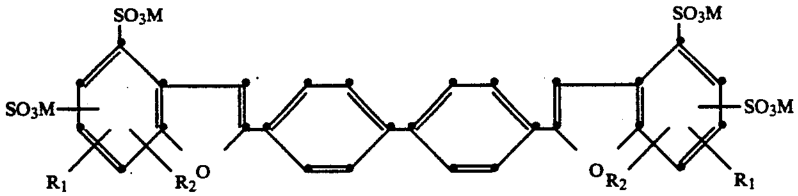
(VI)

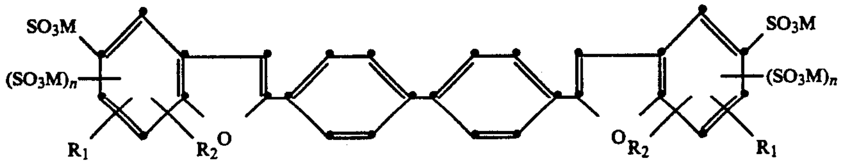
(VIII)

in which $R_1$, $R_2$, M and n have the meanings given above.

However, compounds having the formulae (IV), (VII) and (IX) are particularly interesting.

The benzofuranyl biphenyl compounds according to formula (I) can be prepared according to the following manufacturing processes, in which:

(a) one mole of the compound having the formula (X)

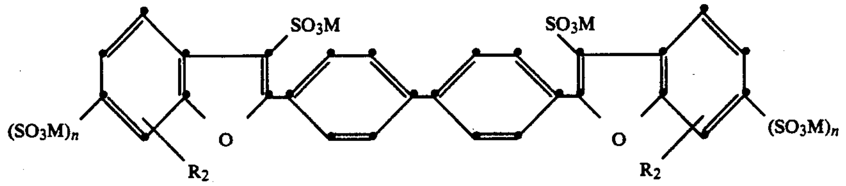
(IV)

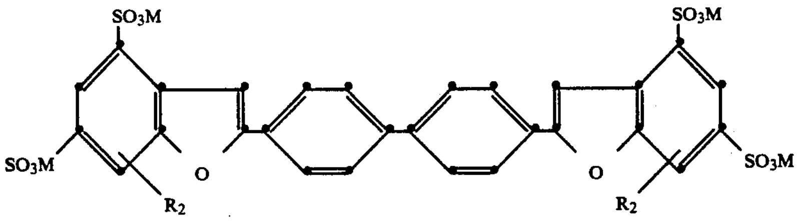
(VII)

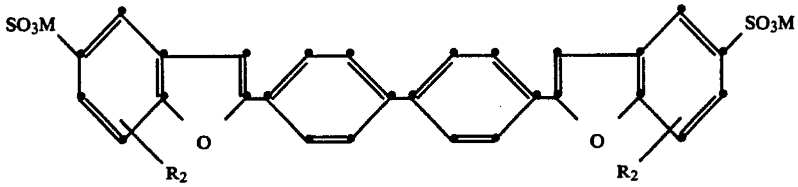
(IX)

in which $R_2$, M and n have the meanings given above.

$R_2$ is preferably hydrogen.

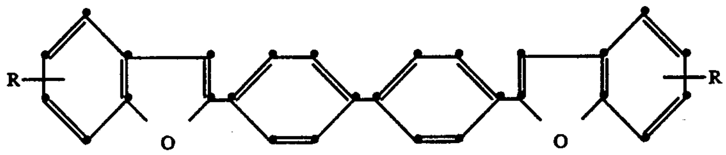
(X)

which has optionally been substituted several times with radicals R=hydrogen, $C_1$–$C_4$ alkyl, $C_1$–$C_4$ alkoxy, halogen, phenoxy and benzyloxy, is reacted with at least stoichiometric quantities of an $SO_3$/ base complex in an inert organic solvent at temperatures from 20° C. to the boiling point of the solvent used, or (b) one of the compounds having the formula (X) is reacted with at least stoichiometric quantities of chlorosulphonic acid in an inert organic solvent at temperatures from 0° to 40° C. or (c) the compound having the formula (X) is heated with concentrated sulphuric acid at temperatures from 40° to 80° C., or (d) one mole of 4,4'-bis(halomethyl)biphenyl is esterified with at least two moles of salicyl aldehyde or anils thereof having the formula (XI) or (XII)

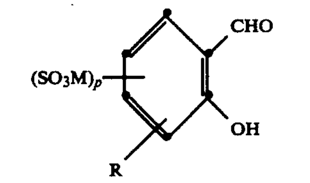

(XI)

or

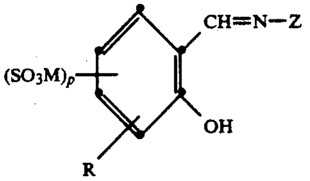

(XII)

which has optionally been substituted several times with radicals R=hydrogen, $C_1$–$C_4$ alkyl, $C_1$–$C_4$ alkoxy, halogen, phenoxy and benzyloxy, and in which M= hydrogen and/or an equivalent of a non-chromophoric cation, p is 1 or 2, and Z=phenyl or chlorophenyl, and the resulting bisphenyl ether having the formula (VIII) or (XIV)

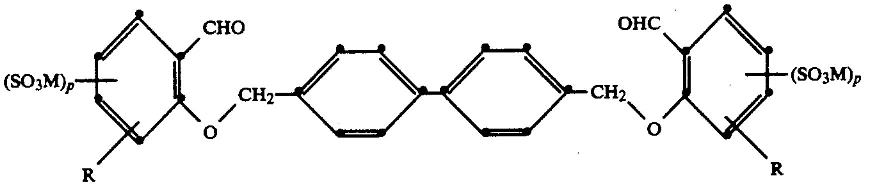

(XIII)

or

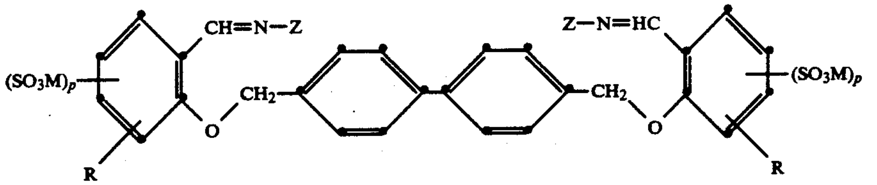

(XIV)

is cyclised with bases.

The starting compounds having the formulae (X), (XI) and (XII) are known and can be prepared by known methods. The intermediate products having the formulae (XIII) and (XIV) are new and can be isolated. However, process (d) is preferably carried out as a single-vessel process without isolation of the intermediate products (XIII) and (XIV).

In particular, the compounds having the formulae (II), (III) and (IV), and especially the compounds having the formulae (II), (III) and (IV), in which n=0, are prepared by process (a).

By $SO_3$/ base complexes are to be understood: addition compounds of $SO_3$ with organic bases, preferably bases containing nitrogen such as, for instance, dioxan, triethylamine, N-ethyl diisopropyl amine, dimethyl formamide (DMF), and particularly pyridine. The stability of these addition compounds is decisive for the degree of sulphonation. Thus, compounds having the formulae (II)–(IV) with n=0 are obtained, for example, when 2 to 6, particularly 3 to 5 moles of $SO_3$/pyridine complex (based on the $SO_3$ content) are used per mole of the compound having the formula (X), and compounds having the formulae (II)–(IV) with n=1 are obtained when 2 to 6 moles, particularly 3 to 5 moles of $SO_3$/DMF (based on the $SO_3$ content) are used per mole of the compound having the formula (X). $SO_3$/-base complexes are known and can be prepared by known methods (E. E. Gilbert, E. P. Jones, Ind. Eng. Chem. 49, N° 9, Part II, p. 1553 et seq. (1957); Beilstein 20, III/IV, 2232).

However, the compounds having the formulae (III) and (IV), in which n=1, are preferably carried out by process (b). In this process, especially one mole of the compound having the formula (X) is reacted with 2 to 20, particularly 6 to 14 moles of chlorosulphonic acid at temperatures from 0° to 40° C., particularly 5° to 25° C., in an inert organic solvent, e.g. saturated aliphatic hydrocarbons such as gasoline, petroleum ether, and ligroin, halogenated aliphatic hydrocarbons such as chloroform, carbon tetrachloride, dichloroethane, trichloroethane, tetrachloroethane, dichloropropane, trichloropropane, dichlorofluoromethane, and dichlorotetrafluoro-ethane, chlorobenzenes such as monochlorobenzene, dichlorobenzene, and trichlorobenzene, nitrobenzenes such as nitrobenzene and nitrotoluene, as well as dicyclic hydrocarbons such as cyclohexane, methylcyclohexane, and decalin.

These solvents are used in process (a).

Process (c) is used for the preparation of the compounds having the formula (V), and particularly the compounds having the formulae (VI) and (VIII). In this process, especially part of the compound having the formula (X) is heated with 10 to 100, preferably 20 to 80, and particularly 30 to 60 parts of 90 to 100% sulphuric acid with stirring at temperatures from 40° to 80° C. and preferably 55° to 70° C.

Process (d) is also used for the preparation of the compounds having the formula (V), and particularly the compounds having the formulae (VIII) and (IX). The etherification is carried out in a known manner at temperatures from 60° to 140° C., and particularly from 100° to 120° C., with an equivalent of a base, such as a tertiary amine or a base mentioned in the subsequent cyclisation, or by using the compounds having the formula XI or XII already in the form of phenolates of this base. The process is carried out in a polar, aprotic solvent or solvent mixture such as, for instance, dimethyl formamide, N-methyl pyrrolidone, hexamethyl phosphoric triamide, tetramethyl urea, or preferably dimethyl sulphoxide.

The cyclisation is also carried out in a polar, aprotic solvent, preferably the same one in which the etherification is carried out, at slightly higher temperatures than those used for the etherification, and in the presence of a base such as, for instance, quaternary ammonium bases, alkaline earth metal hydroxide, alkali metal amides, alkali metal hydrides, alkali metal carbonates, but preferably alkali metal alkoxides such as potassium tert.-butoxide and sodium methoxide and especially alkali metal hydroxides such as sodium, potassium and lithium hydroxides. The basic condensation agents are used in at least stoichiometric quantities, preferably in excess. The process is advantageously carried out with exclusion of atmospheric oxygen and in an inert gas atmosphere. Typical examples of some specific benzofuranyl biphenyl optical brightener compounds usable in the present invention are:

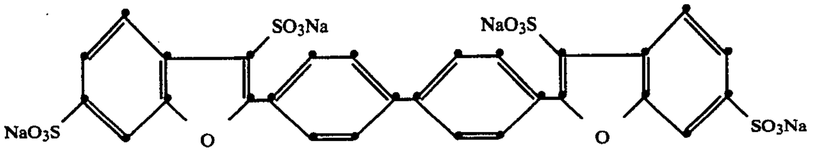
(1)

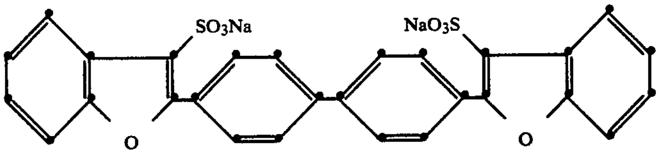
(2)

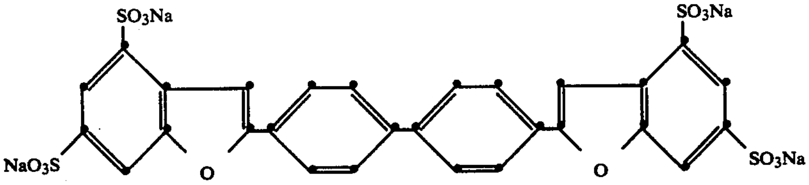
(3)

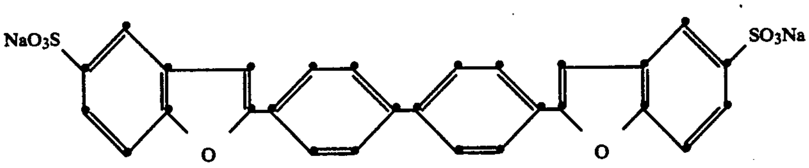
(4)

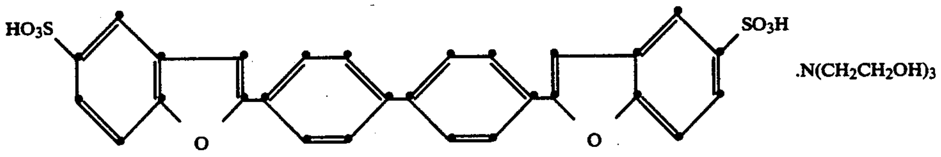
(5)

These benzofuranyl biphenyl compounds can be used in the amounts commonly incorporated from 0.02 to 0.5% by weight in washing or bleaching compositions for the optical brightening of textiles, e.g. fabrics containing cellulose and/or polyamide as well as paper. They are characterized by their outstanding stability with respect to inorganic and organic peroxyacids or salts thereof, together with outstanding brightening properties.

The peroxyacids or salts thereof referred to in this specification include those organic or inorganic compounds described in literature or currently available on the market that can bleach textiles already at temperatures as low as 20° C.

The organic peroxyacids usable in the present invention are compounds having the general formula:

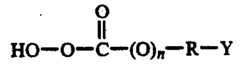

wherein R is an alkylene or substituted alkylene group containing 1 to 20 carbon atoms or an arylene group containing from 6 to 8 carbon atoms, n is 0 or 1, and Y is hydrogen, halogen, alkyl, aryl or any group which provides an anionic moiety in aqueous solution. Such Y groups can include, for example:

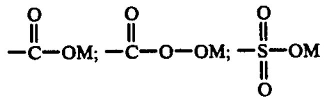

wherein M is H or a water-soluble, salt-forming cation. Where n=0, they are sometimes also referred to as peroxycarboxylic acids and where n=1, they belong to the class of per(oxy)carbonic acids. Preferred organic peroxyacids are solid at room temperature up to about 40° C. They can contain either one, two or more peroxy groups and can be either aliphatic or aromatic. When the organic peroxyacid is aliphatic, the unsubstituted acid may have the general formula:

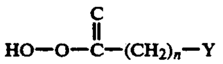

wherein Y can be H, $-CH_3$, $-CH_2Cl$,

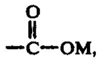,
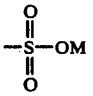

or

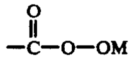

n can be an integer from 1 to 20, preferably 4–16.

Examples of aliphatic peroxyacids are peroxydodecanoic acids, peroxytetradecanoic acids and peroxyhexadecanoic acids, particularly 1,12-diperoxydodecanedioic acid (DPDA) being preferred. Other examples of suitable aliphatic peroxyacids are diperoxyazelaic acid, diperoxyadipic acid, diperoxysebacic acid and alkyl($C_1$-$C_{20}$) dipersuccinic acids.

When the organic peroxyacid is aromatic, the unsubstituted acid may have the general formula:

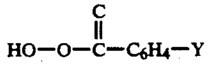

wherein Y is, for example, hydrogen, halogen, alkyl,

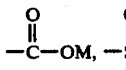,
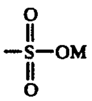
or
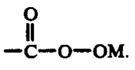.

The percarboxy and Y groupings can be in any relative position around the aromatic ring. The ring and/or Y group (if alkyl) can contain any non-interfering substituents such as halogen or sulphonate groups. Examples of suitable aromatic peroxyacids and salts thereof include monoperoxyphthalic acid; diperoxy therephthalic acid; 4-chlorodiperoxyphthalic acid; diperoxyisophthalic acid; peroxy benzoic acids and ring-substituted peroxy benzoic acids, such as m-chloroperbenzoic acid; and also magnesium monoperphthalate (obtainable under the trade-name "H48" from Interox Chemicals Ltd).

Further examples of organic peroxyacid bleach compounds are described in the following patent literature: EP-A-0083560; EP-A-0105689; EP-A-0166571; EP-A-0168204; EP-A-0195597; EP-A-0206624; and EP-A-0170386.

Preferred organic peroxyacid salts are the magnesium salts such as described in EP-A-0105689; EP-A-0195597; and EP-A-0195663.

As inorganic peroxyacid salts can be named, for example, the potassium permonosulphate triple salt, $K_2SO_4.KHSO_4.2KHSO_5$, which is commercially available from E.I. Dupont de Nemours and Company under the trade-name "Oxone".

In systems where the peroxyacid is formed in situ from its precursor or precursors, the peroxyacid can be formed from the combination of an organic peroxyacid precursor and a persalt of the peroxyhydrate type, e.g. sodium perborate, by perhydrolysis, or from a precursor which generates peroxyacid by hydrolysis. Hence, various peroxyacid precursors will fall within the scope of use in the compositions of the invention. These include benzoyl peroxide and diphthaloyl peroxide, both of which are capable of generating peroxyacids, i.e. perbenzoic acid and monoperoxyphthalic acid, respectively.

Typical examples of peroxyacid precursors generating peroxyacids by perhydrolysis are disclosed in e.g. U.S. Pat. No. 3,256,198; U.S. Pat. No. 3,272,750; GB Patent 836,988; GB Patent 864,798; U.S. Pat. No. 4,283,301; U.S. Pat. No. 4,486,327; U.S. Pat. No. 4,536,314; U.S. Pat. No. 3,686,127; U.S. Pat. No. 4,397,757; U.S. Pat. No. 4,751,015; and EP-A-0120591.

In certain cases and for particular reasons it may be desirable to further activate or catalyse the peroxyacid bleach system. Typical catalysts usable in peroxyacid bleach systems are heavy metals of the transition series, such as Cobalt, Copper, Manganese and Iron, especially Copper. Copper-activated peroxyacid bleach systems have a particular problem of fluorescer stability because the bleach is activated towards the attack of dyestuffs and optical brighteners in solution. These metal catalysts may be presented in the form of their water-soluble salts or complexes.

Use of the benzofuran biphenyl fluorescers in metal-catalysed peroxyacid bleach systems, either as peroxyacid per se with or without an $H_2O_2$-liberating percompound or as peroxyacid precursor with or without a persalt, is thus within the purview of the present invention.

All these peroxyacid compounds are usable in the bleach and detergent compositions of the invention and may be present in an amount of from 0.5–65% by weight of the total composition, preferably from 1–50%, particularly from 1–25% by weight.

These levels as defined for peroxyacid compounds are applicable to organic peroxyacids, peroxyacid salts as well as precursors which generate peroxyacids by hydrolysis or perhydrolysis. The higher side of the range is usually applied to true bleaching compositions which can be used as such for bleaching fabrics or as a bleach adjunct to detergent compositions. The lower side of the range applies to fully formulated heavy duty bleaching detergent compositions. In such compositions the peroxyacid compound is usually present at a level within the range of 0.5–15% by weight, preferably from 1–10% by weight.

In systems comprising an organic peroxyacid precursor and a persalt, the organic peroxyacid precursor will advantageously be used in stoichiometric ratio to the persalt, though higher ratios of persalt to organic precursors can also be used. Preferred persalts are sodium perborate and sodium percarbonate.

Precursors which generate peroxyacids on perhydrolysis are therefore usable at levels of about 0.5–25% by weight, preferably 1–15% by weight, in conjunction with a persalt at levels of about 0.5-50% by weight, preferably 0.5-30% by weight of the composition.

Bleaching detergent compositions of the invention will normally also contain surface-active materials and detergency builders.

The surface-active material may be naturally derived, such as soap, or a synthetic material selected from anionic, nonionic, amphoteric, zwitterionic, cationic actives and mixtures thereof. Many suitable actives are commercially available and are fully described in literature, for example in "Surface Active Agents and Detergents", Volumes I and II, by Schwartz, Perry and Berch. The total level of the surface-active material may range up to 50% by weight, preferably being from about 1% to 40% by weight of the composition, most preferably 4% to 25%.

Synthetic anionic surface-active materials are usually water-soluble alkali metal salts of organic sulphates and sulphonates having alkyl radicals containing from about 8 to about 22 carbon atoms, the term alkyl being used to include the alkyl portion of higher aryl radicals.

Examples of suitable synthetic anionic detergent compounds are sodium and ammonium alkyl sulphates, especially those obtained by sulphating higher ($C_8$-$C_{18}$) alcohols produced, for example, from tallow or coconut oil; sodium and ammonium alkyl ($C_9$-$C_{20}$) benzene sulphonates, particularly sodium linear secondary alkyl ($C_{10}$-$C_{15}$) benzene sulphonates; sodium alkyl glyceryl ether sulphates, especially those esters of the higher alcohols derived from tallow or coconut oil and synthetic alcohols derived from petroleum; sodium coconut oil fatty acid monoglyceride sulphates and sulphonates; sodium and ammonium salts of sulphuric acid esters of higher ($C_9$-$C_{18}$) fatty alcohol alkylene oxide, particularly ethylene oxide, reaction products; the reaction products of fatty acids such as coconut fatty acids esterified with isethionic acid and neutralized with sodium hydroxide; sodium and ammonium salts of fatty acid amides of methyl taurine; alkane monosulphonates such as those derived by reacting alpha-olefins ($C_8$-$C_{20}$) with sodium bisulphite and those derived by reacting paraffins with $SO_2$ and $Cl_2$ and then hydrolyzing with a base to produce a random sulphonate; sodium and ammonium $C_7$-$C_{12}$ dialkyl sulphosuccinates; and olefin sulphonates, which term is used to describe the material made by reacting olefins, particularly $C_{10}$-$C_{20}$ alpha-olefins, with $SO_3$ and then neutralizing and hydrolyzing the reaction product. The preferred anionic detergent compounds are sodium ($C_{11}$-$C_{15}$) alkyl benzene sulphonates, sodium ($C_{16}$-$C_{18}$) alkyl sulphates and sodium ($C_{16}$-$C_{18}$) alkyl ether sulphates.

Examples of suitable nonionic surface-active compounds which may be used, preferably together with the anionic surface-active compounds, include in particular the reaction products of alkylene oxide, usually ethylene oxide, with alkyl ($C_6$-$C_{22}$) phenols, generally 5-25 EO, i.e. 5-25 units of ethylene oxides per molecule; the condensation products of aliphatic ($C_8$-$C_{18}$) primary or secondary linear or branched alcohols with ethylene oxide, generally 6-30 EO, and products made by condensation of ethylene oxide with the reaction products of propylene oxide and ethylene diamine. Other so-called nonionic surface-actives include alkyl polyglycosides, long chain tertiary amine oxides, long chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

As stated above, soaps may also be incorporated in the compositions of the invention, preferably at a level of less than 25% by weight. They are particularly useful at low levels in binary (soap/anionic) or ternary mixtures together with nonionic or mixed synthetic anionic and nonionic compounds. Soaps which are used are preferably the sodium, or, less desirably, potassium salts of saturated or unsaturated $C_{10}$-$C_{24}$ fatty acids or mixtures thereof. The amount of such soaps can be varied between about 0.5% and about 25% by weight, with lower amounts of about 0.5% to about 5% being generally sufficient for lather control. Amounts of soap between about 2% and about 20%, especially between about 5% and about 10%, are used to give a beneficial effect on detergency. This is particularly valuable in compositions used in hard water when the soap acts as a supplementary builder.

Detergency builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate; nitrilotriacetic acid and its water-soluble salts; the akali metal salts of carboxymethyloxy succinic acid, ethylene diamine tetraacetic acid, oxydisuccinic acid, mellitic acid, benzene polycarboxylic acids, citric acid; and polyacetal carboxylates as disclosed in U.S. Pat. Nos. 4,144,226 and 4,146,495.

Examples of precipitating builder materials include sodium orthophosphate, sodium carbonate and long chain fatty acid soaps.

Examples of calcium ion-exchange builder materials include the various types of water-insoluble crystalline or amorphous aluminosilicates, of which zeolites are the best known representatives, e.g. zeolites X, Y and A. In particular, the compositions of the invention may contain any one of the organic or inorganic builder materials, such as sodium or potassium tripolyphosphate, sodium or potassium pyrophosphate, sodium or potassium orthophosphate, sodium carbonate, the sodium salt of nitrilotriacetic acid, sodium citrate, carboxymethyl malonate, carboxymethyloxy succinate and the water-insoluble crystalline or amorphous aluminosilicate builder materials, or mixtures thereof.

These builder materials may be present at a level of, for example, from 5 to 80% by weight, preferably from 10 to 60% by weight.

Apart from the components already mentioned, the detergent compositions of the invention can contain any of the conventional additives in the amounts in which such materials are normally employed in fabric washing detergent compositions. Examples of these additives include lather boosters, such as alkanol amides, particularly the monoethanol amides derived from palmkernel fatty acids and coconut fatty acids; lather depressants, such as alkyl phosphates and silicones; anti-redeposition agents, such as sodium carboxymethyl cellulose and alkyl or substituted alkyl cellulose ethers; peroxide stabilizers, such as ethylene diamine tetraacetic acid, ethylene diamine tetra(methylene phosphonic acid) and diethylene triamine penta(methylene phosphonic acids, inorganic salts, such as sodium sulphate, and, usually present in very small amounts, fluorescent agents, perfumes, germicides, colourants and enzymes, such as proteases, cellulases, lipases and amylases.

Other useful additives are polymeric materials, such as polyacrylic acid, polyethylene glycol and the copolymers (meth)acrylic acid and maleic acid, which may also be incorporated to function as auxiliary builders together with any of the principal detergency builders, such as the polyphosphates, aluminosilicates and the like.

It goes without saying that all these components and ingredients should preferably and advantageously be sufficiently stable with respect to the peroxyacid bleach system in the composition.

Bleaching detergent compositions of the invention may be granular, liquid, a solid bar or a semi-solid, e.g. a gel or paste, which can be manufactured according to techniques known in the art.

Owing to the combination of the invention it is possible to offer bleaching and detergent compositions which fulfil the usual standard as regards, for instance, detergency, stain removal, freshening of the appearance of the articles washed, also when the washing is carried out at temperatures from 20°-50° C. Consequently, coloured wash and white wash can be advantageously laundered independent of the fibres.

The following Examples illustrate the invention; parts and percentages used in the Examples are by weight, unless indicated otherwise.

EXAMPLE I

The following base powder compositions were prepared by the technique of spray-drying an aqueous slurry of the basis ingredients, followed by post-dosing of the peroxyacid, i.e. DPDA granules containing 12% DPDA/rest sodium sulphate.

| Base Powder Composition | Parts by Weight |
|---|---|
| Sodium $C_{12}$-alkylbenzene sulphonate | 9.4 |
| Nonionic alcohol/ethoxylate | 3.1 |
| Alkaline sodium silicate | 11.3 |
| Sodium triphosphate | 43.8 |
| Sodium carboxymethyl cellulose | 1.3 |
| Sodium sulphate | 18.1 |
| Sodium toluene sulphonate | 1.4 |
| Water | 11.6 |

The stability test was made with 1 liter of water thermostatted at 40° C., mechanically stirred at 100 rpm.

Dosages: Base powder 4 g/l Optical brightener 0.012 g/l at $E^1_1$ 600 DPDA $4.6\times10^{-4}$ moles/l.

Optical brightener compound (2) of the invention was used and compared with other known optical brighteners of the art available commercially.

The fluorescer stability was determined in terms of % fluorescer remaining in the wash solution and in a nonionic storage model system.

The results are tabulated below.

TABLE 1

| | % Fluorescer remaining after | | |
|---|---|---|---|
| | in wash solution | in nonionic storage model | |
| | 30 minutes | 5 hours | 17 hours |
| Compound (2) | 100 | 100 | 98 |
| Blankophor BHC* ex Bayer | 94 | 98 | 91 |
| Tinopal DMS-X** ex Ciba-Geigy | 48 | 60 | 47 |
| Tinopal CBS-X*** ex Ciba-Geigy | 53 | 68 | 60 |

It can be seen from these results that the benzofuran-biphenyl compound (2) in the composition of the invention showed exceptional stability, even better than Blankophor BHC, which is known as the most bleach-stable optical brightener currently available on the market.

*Blankophor BHC = Blankophor CKA (-electrolyte)

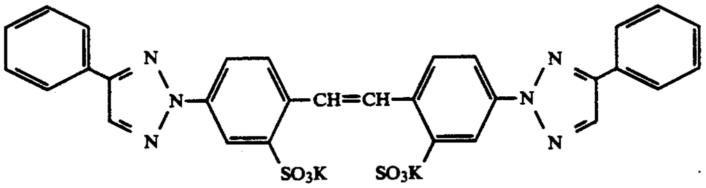

**Tinopal DMS

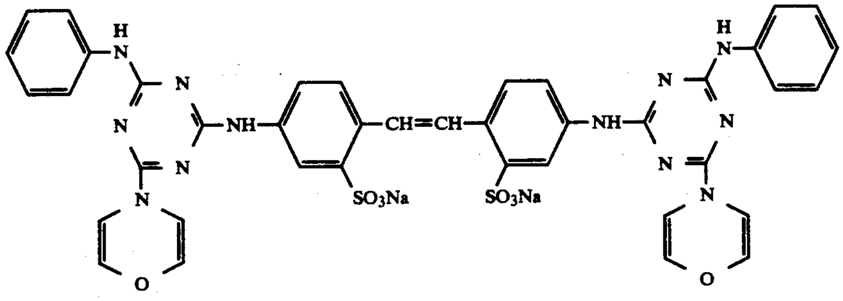

***Tinopal CBS

-continued

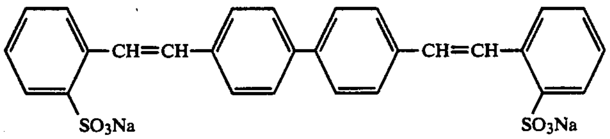

METHOD OF TESTING THE STABILITY OF A FLUORESCER TOWARDS DPDA IN A NONIONIC PHASE

This method has previously given good correlations with storage stability tests carried out with spray-dried powders.

The method assumes that the reaction phase in a powder is composed largely of nonionic active. Fluorescer is pre-dissolved in nonionic and kept in contact with solid bleach for 5 or 17 hours. After reduction of the bleach and dilution of the reaction mixture, the remaining fluorescer was estimated by UV absorption at 365 nm or by fluorescence measurements at 460 nm.

PROCEDURE

A. Preparation of Stock Solution of Fluorescer

Fluorescer (1.6 g at $E^1{}_1$ 600) is slurried with a small amount of Tergitol 15-S-7 and then washed with extra Tergitol 15-S-7 (80 ml in total) into a graduated flask containing disodium hydrogen phosphate ($Na_2HPO_4.2H_2O$ 1.777 g) dissolved in distilled water (20 ml). This mixture was kept in a water bath at 35° C. overnight (17 hours) and then centrifuged. Any solid or opaque liquid was separated from the clear fluorescer solution which was used in subsequent experiments.

B. Reaction of Fluorescer with DPDA

DPDA (0.1 g) as granules* were placed in a test tube. 5 ml of fluorescer stock solution was added and stirred briefly with a glass rod to ensure that the DPDA granules are covered and in complete contact with the nonionic phase.

* ex Degussa containing 12% DPDA granulated with $Na_2SO_4$.

After 5 or 17 hours at 35° C. the contents of the test tube were washed into a graduated flask and made up to 250 ml with aqueous sodium sulphite solution (1%). After filtration (if necessary) 50 ml of this stock solution was diluted to 1000 ml with demineralised water. The concentration of fluorescer that remained was measured by UV absorption or by fluorescence measurements.

The fluorescer concentration was averaged from 4 separate stability determinations and compared with a blank experiment containing no bleach.

EXAMPLE II

The stability of three other optical brightener compounds of the invention, i.e.

1) Compound (3)
2) Compound (4) and
3) Compound (6) of formula in wash solutions was determined in the manner exactly as described in Example I.

The results are tabulated below as Table 2.

TABLE 2

| | % Fluorescer remaining in wash solution after 30 min. |
|---|---|
| Compound (3) | 100 |
| Compound (4) | 100 |
| Compound (6) | 91 |

These results again show the excellent stability of compounds (3), (4) and (6) of the invention in wash solutions containing the peroxyacid bleach DPDA.

EXAMPLE III

The stability of optical brightener compound (2) of the invention towards bleach systems wherein the peroxyacid is formed in situ, was compared with that of the commercial products Blankophor BHC and Tinopal DMS-X, in a nonionic storage model system for 17 hours as described in Example I.

The bleach system consisted of a mixture of a peroxyacid precursor and sodium perborate. The precursors used were:

1) N,N,N',N-tetraacetyl ethylene diamine (TAED)
2) Sodium benzoyloxy benzene sulphonate (SBOBS)
3) Choline sulphophenyl carbonate (CSPC)
4) Quaternary ammonium subst. methyl-benzoyloxy-benzene sulphonate (Q-MBOBS)

The precursor level was 0.175 moles/l (except for TAED which delivered 2 moles of peroxyacid and was therefore used as 0.0875 moles/l). Sodium perborate was used at 0.52 moles/l. The fluorescer was used at 1.6 g ($E^1{}_1$ 600) per liter of nonionic/water mixture.

The following results were observed:

TABLE 3

| | % Fluorescer remaining after 17 hours | | |
|---|---|---|---|
| Bleach system | Compound (2) | Blankphor BHC | Tinopal DMS-X |
| TAED perborate | 100 | 99 | 26 |
| SBOBS/perborate | 100 | 100 | 28 |
| CSPC/perborate | 100 | 99 | 93 |
| QMBOBS/perborate | 100 | 94 | 45 |

EXAMPLE IV

The stability of optical brightener compound (2) of the invention against potassium monopersulphate (MPS) was determined in a nonionic/water phase (nonionic storage model system) for 17 hours as described in Example I.

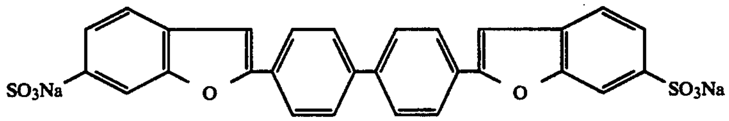

(6)

The fluorescer was used at 0.16 g/l (at $E^1{}_1$ 600), the monopersulphate at 0.175 moles/liter and $CuSO_4.5H_2O$ at 0.014 moles/liter.

The results are shown in the following Table 4.

TABLE 4

| Fluorescer | % Fluorescer remaining after 17 hours | |
|---|---|---|
| | MPS | MPS/$CUSO_4$* |
| Compound (2) | 100 | 100 |
| Blankophor BHC | 92 | 75 |
| Tinopal DMS-X | 60 | 52 |

*A useful bleach system for dye transfer inhibition. These results again show the superiority in stability of the optical bleach compound of the invention over Blankophor BHC and Tinopal DMS-X of the art.

EXAMPLE V

Fluorescer stability was determined in an aqueous liquid bleach composition containing DPDA and hydrogen peroxide of the following formulation:

| | | % by weight |
|---|---|---|
| Secondary alkane sulphonate | | 6.2 |
| Nonionic alcohol ethoxylate | | 1.6 |
| Hardened coconut fatty acid | | 1.6 |
| $H_2O_2$ | | 7.5 |
| DPDA | | 5.0 |
| Sodium sulphate | | 2.4 |
| Phosphonate stabiliser | | 0.13 |
| Perfume, anti-foam and water | to | 100.0% |

The fluorescer was added to the liquid composition at a level of 0.2% ($E^1{}_1$ 600) and stored at 37° C.

The results after 1 and 2 weeks' storage are tabulated below.

TABLE 5

| | % Fluorescer remaining after | |
|---|---|---|
| | 1 week | 2 weeks |
| Compound (2) | 100 | 82 |
| Blankophor CKA | 72 | 75 |
| Tinopal DMS-X | 6 | 3 |

EXAMPLE VI

Fluorescer stability tests were carried out in a nonaqueous liquid composition containing TAED/perborate of the following composition:

| Composition | Parts by weight |
|---|---|
| Liquid nonionic alcohol ethoxylate (Dobanol ® 91/5T) | 36.45 |
| Dodecyl benzene sulphonic acid | 1.0 |
| Calcite | 6.0 |

-continued

| Composition | Parts by weight |
|---|---|
| Sodium carbonate | 29.5 |
| Glycerol triacetate | 5.0 |
| Sodium acrylate/styrene sulphonate polymer | 0.5 |
| Sodium perborate monohydrate | 15.0 |
| TAED | 4.0 |
| Sodium carboxymethyl cellulose | 1.0 |
| Ethylene diamine tetraacetate | 0.15 |
| Proteolytic enzyme | 0.6 |

The fluorescers were added at a level of 0.18% (at E', 600) and the compositions were stored at 37° C. and at room temperature.

The results observed were as follows:

TABLE 6

| | % Fluorescer remaining after | |
|---|---|---|
| | 8 weeks (37° C.) | 7 weeks (room temperature) |
| Composition (2) | 73 | 83 |
| Blankophor CKA | 42 | 54 |
| Tinopal DMS pure extra | 10 | 54 |

The superiority of compound (2) of the invention over Blankophor CKA and Tinopal DMS was again confirmed.

I claim:

1. A bleaching composition comprising:

(i) a bleaching compound selected form the group consisting of peroxyacids, peroxyacid yielding compounds, persalts and mixtures thereof present in effective amounts to bleach a substrate; and (ii) an optical brightening compound present in an effective amount to optically brighten a substrate, selected from the group consisting of sulphonated benzofuranyl biphenyl compounds of formula:

(A)

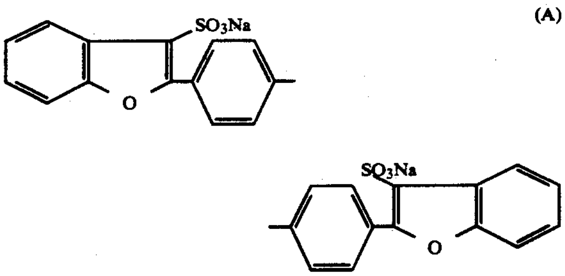

2. A composition according to claim 1, wherein said sulphonated benzofuranyl biphenyl optical brightener is present in an amount of from 0.02 to 0.5% by weight of the composition.

3. A composition according to claim 1, further comprising a surface-active material in an amount from about 1 to about 40%.

* * * * *